April 22, 1958  J. S. DAVIES  2,831,357
VARIABLE SPEED FRICTION TRANSMISSION
Filed Oct. 19, 1953  3 Sheets-Sheet 1

John S. Davies
INVENTOR.

April 22, 1958   J. S. DAVIES   2,831,357
VARIABLE SPEED FRICTION TRANSMISSION
Filed Oct. 19, 1953   3 Sheets-Sheet 2
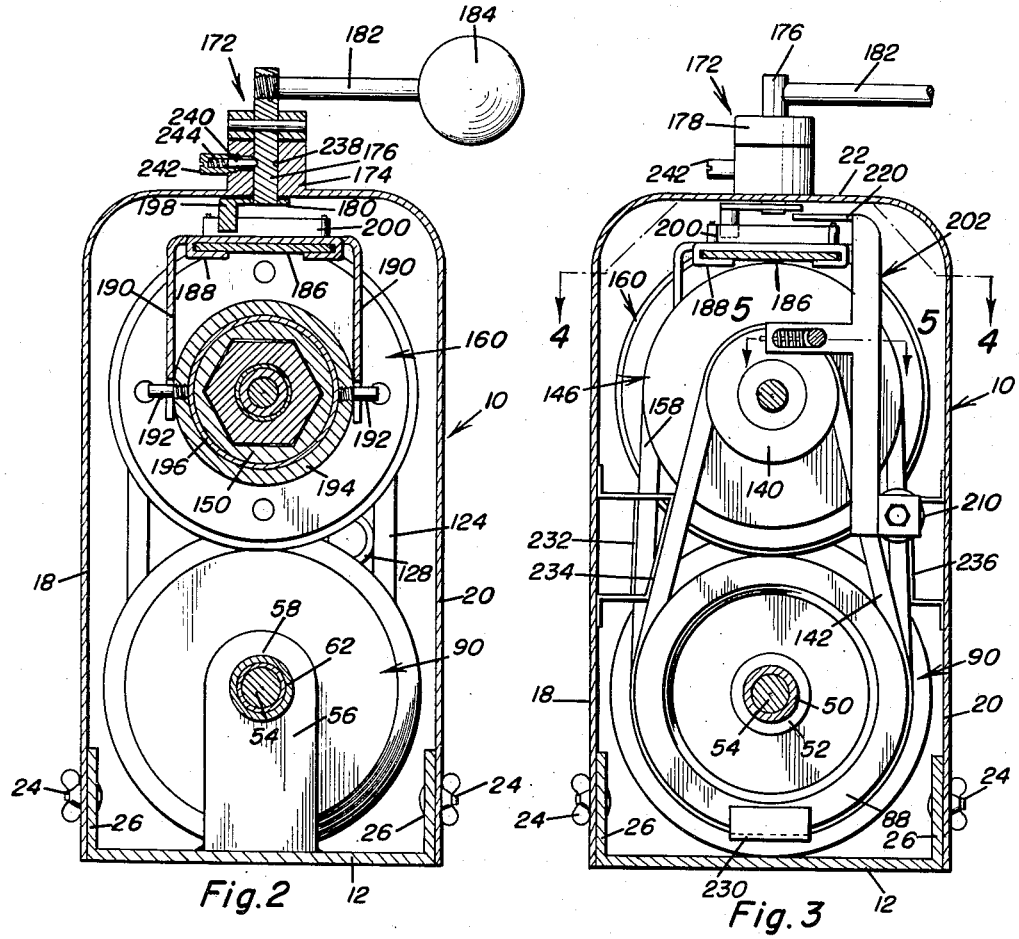
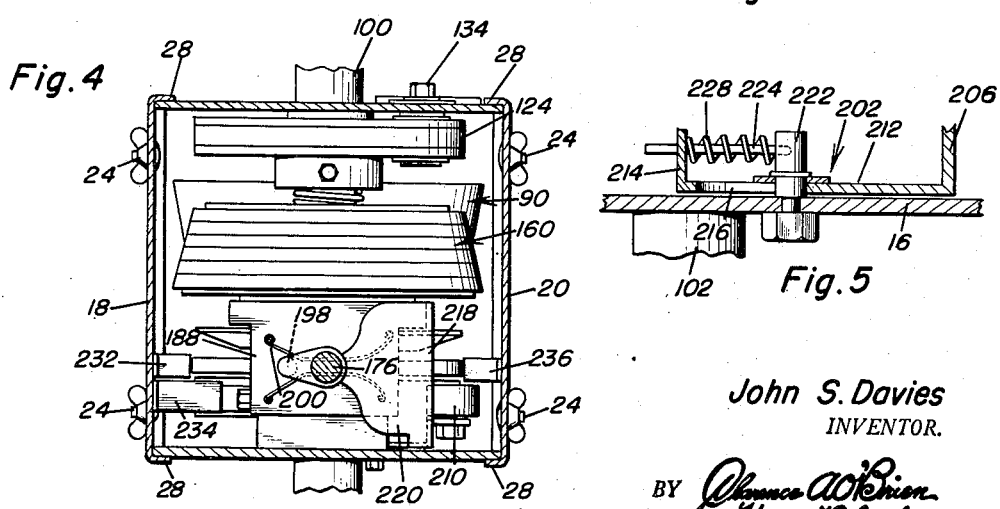
John S. Davies
INVENTOR.

April 22, 1958     J. S. DAVIES     2,831,357
VARIABLE SPEED FRICTION TRANSMISSION
Filed Oct. 19, 1953     3 Sheets-Sheet 3
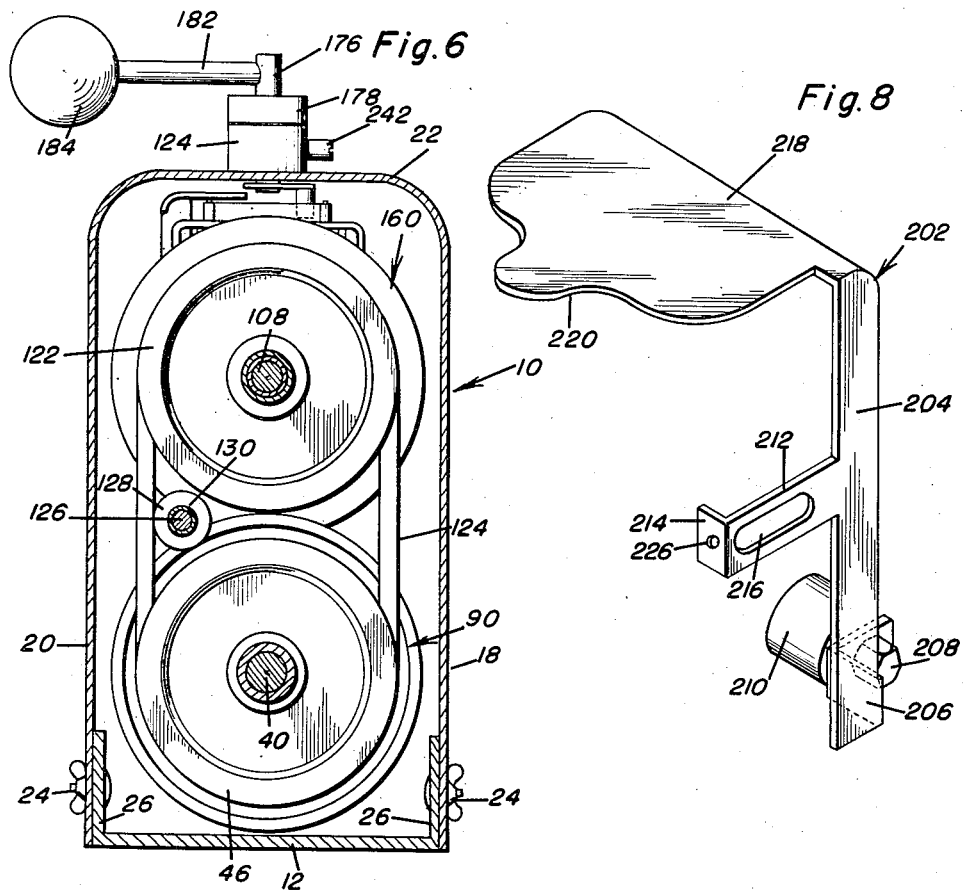
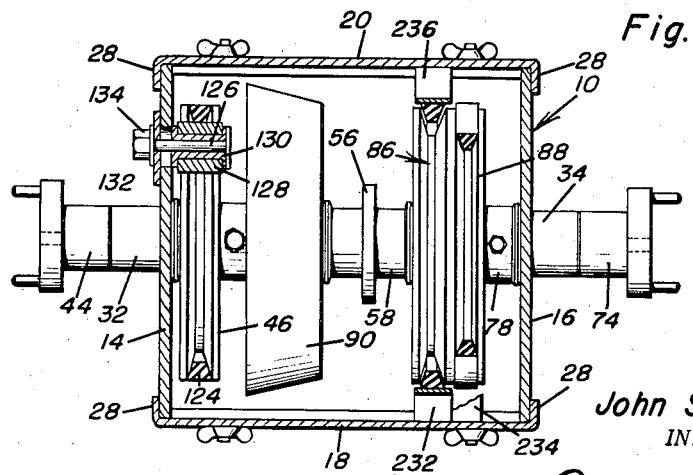
John S. Davies
INVENTOR.

United States Patent Office 2,831,357
Patented Apr. 22, 1958

2,831,357

VARIABLE SPEED FRICTION TRANSMISSION

John S. Davies, Monrovia, Calif.

Application October 19, 1953, Serial No. 386,681

11 Claims. (Cl. 74—203)

This invention relates in general to improvements in transmissions, and more specifically to a variable speed transmission specifically designed for power units of low horsepower.

The primary object of this invention is to provide a transmission which is intended for use with small power units, the transmission being of the selectively shifting type and including all frictional elements so as to be both light in weight and economically feasible.

Another object of this invention is to provide an improved transmission through which various speeds forward and a reverse drive are obtainable, the friction transmission being formed of entirely friction drive elements.

Another object of this invention is to provide an improved shifting transmission for a friction transmission which is of a nature whereby friction wheels may be selectively engaged and disengaged and drive belts may be selectively tensioned.

A further object of this invention is to provide an improved transmission which is of a variable speed type, and which has a reverse, the transmission being formed solely of pulleys and drive belts and friction wheels so as to eliminate the necessity for complicated drive gears and thereby be economically feasible for small power units.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a transverse vertical sectional view on a reduced scale taken substantially upon the plane indicated by the section line 2—2 of Figure 1 and shows the coupling between a hub of a pulley and a friction wheel and shift means for shifting the friction wheel with respect to the pulley;

Figure 3 is a transverse vertical sectional view on a reduced scale taken substantially upon the plane indicated by the section line 3—3 of Figure 1 and shows the means for selectively tensioning a drive belt of the transmission;

Figure 4 is a fragmentary transverse horizontal sectional view taken substantially upon the plane indicated by the section line 4—4 of Figure 3 and shows the shifting mechanism for the transmission;

Figure 5 is an enlarged fragmentary sectional view taken substantially upon the plane indicated by the section line 5—5 of Figure 3 and shows the means for returning the belt tensioning means of Figure 3 to an inoperative position;

Figure 6 is a vertical sectional view on a reduced scale taken substantially upon the plane indicated by the section line 6—6 of Figure 1 and shows the relationship of drive pulleys carried by a drive shaft and an idler shaft of the transmission including means for selectively tensioning a drive belt entrained thereover;

Figure 1:
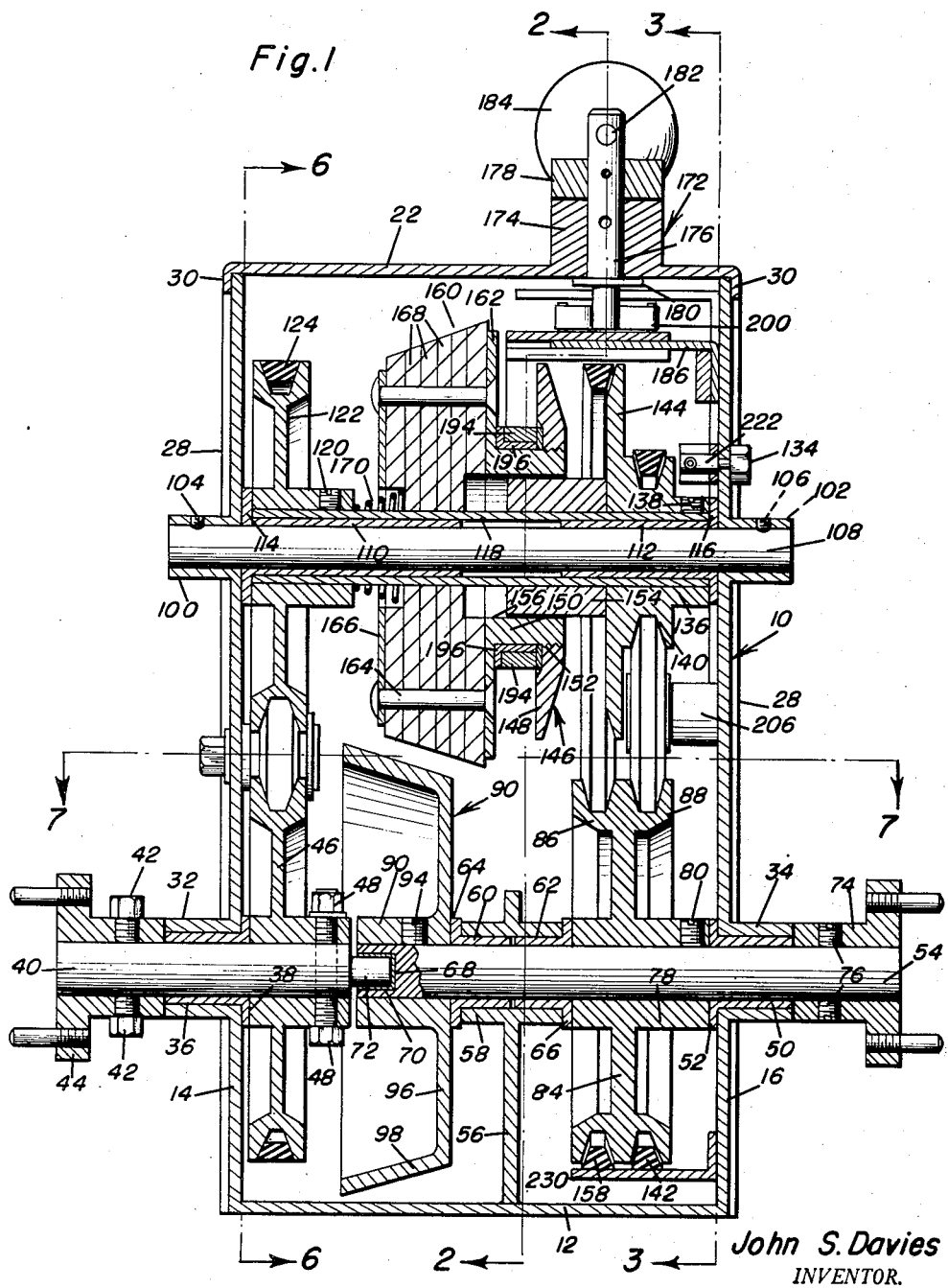
Figure 1 is a longitudinal vertical sectional view taken through the variable speed friction transmission which is the subject of this invention and shows the relationship of the various drive elements thereof.

Figure 7 is a horizontal sectional view on a reduced scale taken substantially upon the plane indicated by the section line 7—7 of Figure 1 and shows the relationship of the pulleys and friction wheel carried by the drive shaft and a driven shaft; and Figure 8 is an enlarged perspective view of the roller for tensioning the drive belt of Figure 3 and shows the means for mounting the same and selectively moving it into an operative position.

Referring now to the drawings in detail, it will be seen that the variable speed friction transmission which is the subject of this invention includes a housing which is referred to in general by the reference numeral 10. The housing 10 includes a bottom 12 which is formed integral with vertically extending front and rear walls 14 and 16, respectively. The housing 10 also includes vertically extending side walls 18 and 20 which are connected together by an integral top wall 22. The side walls 18 and 20 and top wall 22 are removably secured to the bottom wall 12 by fasteners 24 which pass through upwardly extending flanges 26 which are formed integrally along the side edges of the bottom wall 12.

As is best illustrated in Figures 4 and 7, the side walls 18 and 20 are provided with vertically extending flanges 28 along their front and rear edges. The flanges 28 engage the faces of the front walls 14 and 16 to position the side walls 18 and 20 with respect to the front and rear walls 14 and 16, respectively. Also carried by the forward and rear edges of the top wall 22 are depending flanges 30. The flanges 30 are continuous with the flanges 28 and engage the upper edges of the front and rear walls 14 and 16, respectively.

Carried by the front wall 14 and projecting forwardly therefrom in a central bottom portion thereof is a tubular boss 32. The tubular boss 32 has aligned therewith a tubular boss 34 carried by the rear wall 16 and projecting rearwardly therefrom. Carried within the tubular boss 32 is a bearing 36 which has an annular rear flange 38 in abutment with the rear surface of the front wall 14. Rotatably journaled within the bearing 36 is a drive shaft 40. The drive shaft 40 has rigidly secured to the forward portion thereof by fasteners 42 a coupling 44. It will be understood that the coupling 44 is of a type to be suitably connected to the desired power unit (not shown). Also carried by the drive shaft 40, but within the housing 10, is a main drive pulley 46. The main drive pulley 46 is secured to the rear portion of the drive shaft 40 by suitable fasteners 48.

Carried within the tubular boss 34 is a bearing 50 which is identical with the bearing 36. The bearing 50 is provided with a forward annular flange 52 which engages the forward surface of the rear wall 16. Mounted within the bearing 50 for rotation is a driven shaft 54.

Extending upwardly from the bottom wall 12 intermediate the front wall 14 and the rear wall 16 is a supporting flange 56. The supporting flange 56 is provided with a tubular portion 58 in alignment with the tubular bosses 32 and 34. Carried within the tubular portion 58 are suitable bearings 60 and 62 which are provided with forward and rear annular flanges 64 and 66, respectively.

It will be noted that the driven shaft 54 is in alignment with the drive shaft 40 and that it is suitably journaled within the bearings 60 and 62 as well as the bearing 50. The forward end of the driven shaft 54 is provided with a cylindrical recess in which is mounted a suitable bearing 70. The rear end of the drive shaft 40 is provided with a reduced rear end 72 which is suitably journaled within the bearing 70 and supported by the forward end of the driven shaft 54.

Mounted on the extreme rear end of the driven shaft 54 is a coupling 74. The coupling 74 is secured to the driven shaft 54 by suitable fasteners 76 and is of a type to be conveniently connected to a drive shaft for a propeller or a differential, as desired.

Mounted on the driven shaft 54 for rotation therewith intermediate the flanges 52 and 66 is a hub 78. The hub 78 is secured to the driven shaft 54 by a suitable fastener 80 and includes an outwardly extending web 84. Formed integrally with the web 84 is a pair of pulleys 86 and 88, the pulleys 86 and 88 being of the same size and being in side abutting relation.

Also, carried by the driven shaft 54 is a wheel which is referred to in general by the reference numeral 90. The wheel 90 includes a hub 92 which is secured to the forward end of the driven shaft 54 by a suitable fastener 94. Formed integral with the hub 92 is a web 96. Carried by the web 96 is a frusto-conical rim 98.

The central upper portion of the front wall 14 is provided with a forwardly extending tubular boss 100. The rear wall 16 is provided with a rearwardly extending tubular boss 102, the bosses 100 and 102 being in longitudinal alignment. Extending through and secured in the bosses 100 and 102 by suitable fasteners 104 and 106, respectively, is a fixed shaft 108.

Carried by opposite ends of the fixed shaft 108 were bearings 110 and 112. The bearings 110 and 112 have annular flanges 114 and 116 which engage the rear surface of the front wall 14 and the front section of the rear wall 16, respectively. Rotatably mounted on the bearings 110 and 112 for rotation with respect to the fixed shaft 108 is a tubular idler shaft 118.

Secured to the forward end of the idler shaft 118 by fastener 120 for rotation therewith is a pulley 122. The pulley 122 is in vertical alignment with the pulley 46 and entrained over the pulleys 46 and 122 for drivingly connecting the same is a drive belt 124.

As is best illustrated in Figures 1, 6 and 7, carried by the front wall 14 is a stub shaft 126. The stub shaft 126 has rotatably mounted thereon a roller 128 which is provided with a suitable bearing 130. The stub shaft 126 passes through an elongated horizontal slot 132 in the front wall 14 to permit selective adjustment of the roller 128. The stub shaft 126 is secured in an adjusted position through the use of a clamping nut 134. It will be noted that the roller 128 engages the drive belt 124 so as to selectively tension the same to insure driving relationship between the pulleys 46 and 122.

Carried by the idler shaft 118 for rotation therewith is a hub 136. The hub 136 is secured to the rear portion of the idler shaft 118 by a suitable fastener 138 and has its rear end in engagement with the flange 116 of the bearing 112. Formed integrally with the hub 136 is a pulley 140. The pulley 140 is in vertical alignment with the pulley 88. Entrained over the pulleys 140 and 88 is a drive belt 142. The drive belt 142 is selectively tensioned in a manner to be set forth in more detail hereinafter for operatively connecting the idler shaft 118 to the driven shaft 54 through the pulleys 140 and 88.

Formed integrally with the hub 136 at its forward end is one flange 144 of a split flange pulley which may be referred to in general by the reference numeral 146. The pulley 146 also includes a second flange 148 which is adjustably secured to a hub 150 by a threaded connection 152.

Carried by the idler shaft 118 for rotation therewith is a polygonal cross-sectional drive member 154. The drive member 154 slidingly receives the hub 150 which has a central opening 156 of a similar cross-section. In this manner the hub 150 is rotatably connected to the idler shaft 118 yet slidable with respect thereto. It will be seen that by sliding the hub 150 towards and away from the flange 144, the flange 148 may selectively cooperate with the flange 144 to form an operative pulley 146. When the flanges 144 and 148 are in cooperating relation, they are aligned with the pulley 86. Entrained over the pulley 86 and the pulley 146 is a drive belt 158. The drive belt is tensioned only when the flange 148 is in a cooperative position with respect to the flange 144 and thus the pulley 146 is drivingly connected to the pulley 86 only when the flange 148 is in its rearward position. The hub 150 forms parts of the wheel which is referred to in general by the reference numeral 160. The wheel 160 includes an annular mounting flange 162 formed integrally with the forward edge of the hub 150. Secured to the flange 162 by a plurality of fasteners 164 and a forward clamping flange 166 is a plurality of friction disks 168. Friction disks 168 are so configurated so as to form a frusto-conical surface which is complementary to the surface of the rim 98 and which is flexibly engageable therewith. In order that the wheel 160 may be constantly urged to a position out of engagement with the wheel 90, there is carried by the idler shaft 118 a spring 170 which abuts both the pulley 122 and the wheel 160.

In order that the various desired drive ratios may be obtained with the transmission, there is carried by the top wall 22 a shifting mechanism which is referred to in general by the reference numeral 172. The shifting mechanism 172 includes a tubular boss 174 which extends upwardly from the top wall 22 substantially in alignment with the pulley 146. Extending through the tubular boss 174 is a shifting control shaft 176. Carried by the upper portion of the shifting control shaft 176 is a collar 178 which cooperates with a collar 180 formed integrally with the shaft 176 to vertically position the same, the collar 180 engaging the underside of the top wall 22. The shaft 176 is also provided with a suitable shifting arm 182 which has mounted on the free end thereof a shifting ball 184.

As is best illustrated in Figures 1 and 2, carried by the rear wall 16 and projecting forwardly therefrom is a flange 186, the flange 186 overlying the pulley 146. Slidably mounted on the flange 186 with forward and rearward movement is a channel shape cross-sectional slide member 188. The slide member 188 is provided with a pair of transversely aligned, depending legs 190 which are connected to transversely extending pins 192 carried by a collar 194 mounted on the hub 150. The collar 194 includes a bearing 196 and remains stationary when the hub 150 is being rotated. The collar 194 is disposed between the mounting flange 162 and the flange 148 so that the hub 150 is moved longitudinally of the housing 10 when the slide member 188 is moved in a similar direction.

Carried by the collar 180 in eccentric relation with respect to the shaft 176 is a pin 198. The pin 198 is disposed between a pair of arcuate leaf springs 200 projecting upwardly from the top of the slide member 188. The leaf springs 200 are anchored at their ends only and are permitted to flex whereby the pin 198 may be moved relative thereto.

Referring now to Figure 8 in particular, it will be seen that there is illustrated a tensioning roller assembly 202 for the drive belt 142. The assembly 202 includes a vertically extending leg 204 which terminates at its lower end in a Z-shaped mounting portion 206. Carried by the Z-shaped mounting portion 206 is a stub shaft 208 on which a roller 210 is rotatably mounted.

Carried by the leg 204 intermediate its ends and extending to the side thereof opposite from the roller 210 is a flange 212. The flange 212 terminates in a forwardly extending flange 214. The flange 212 is provided with an elongated slot 216 which extends longitudinally of the flange 212.

Formed integrally with the upper end of the leg 204 and extending transversely thereof is a plate 218. The plate 218 has an edge thereof projecting in the same direction as the flange 212 which is cam shaped in outline, the edge being referred to as a cam 220.

Referring now to Figure 5 in particular, it will be seen that the assembly 202 is carried by the forward face of the rear wall 16. Securing the assembly to the rear wall 16 is a fastener 222 which is received through the slot 216. The flange 212 both pivots and slides with respect to the fastener 222. Also carried by the fastener 222 is a pin 224 which passes through an aperture 226 in the flange 214. Extending between the fastener 222 and the flange 214 and carried by the pin 224 is a spring 228. The spring urges the assembly 202 to the left, as viewed in Figures 4 and 5.

It will be understood that at the times the drive belts 142 and 158 are not being utilized the respective drive belts are loose. In order that they may be retained in their proper vertical planes, there is secured to the rear wall 16 a forwardly extending flange 230, which is best illustrated in Figure 1, underlying the pulleys 86 and 88 to support the bottom portions of the drive belts 142 and 158. Referring to Figures 3 and 4 in particular, it will be seen that the side wall 18 is provided with a pair of inwardly extending guides 232 and 234 for the drive belts 158 and 142, respectively. Further, the side wall 20 is provided with an inwardly extending guide 236 for the drive belt 158. The roller 210 is disposed adjacent the drive belt 142 on the side thereof adjacent the side 20 so as to limit outward movement thereof at that point.

As illustrated in the drawings, the entire assembly of the transmission is in a neutral position. Thus, the drive shaft 40 and the idler shaft 118 may be free to rotate with an associated power source without the driven shaft 54 being rotated. When it is desired to rotate the driven shaft 54 in a direction opposite from that of the drive shaft 40, the wheel 160 is moved rearwardly until the friction disks 168 thereof engage the rim 98. This causes a counter-rotation of the driven shaft 54. Movement of the wheel 160 forwardly to its driving position is accomplished by rotating the shaft 176 in a clockwise direction urging the slide member 188 forwardly.

In order that the shaft 176 may be retained in a selected position, it is provided with a plurality of circumferentially spaced recesses 238 which have selectively engaged therein one end of a pin 240. The pin 240 is carried by a hollow screw member 242 which is threaded into the boss 174. The pin 240 is urged into engagement with the shaft 176 by a spring 244 carried by the fastener 242.

When the shaft 176 is rotated in a counter-clockwise direction, the pin 198 moves the slide member 188 rearwardly. This causes the flange 148 to cooperate with the flange 144 to form the pulley 146. This tensions the drive belt 158 with the result that the pulleys 146 and 86 are connected and the driven shaft 54 is driven at the same speed and in the same direction as the drive shaft 40.

When it is desired for the driven shaft 54 to be rotated in the same direction as the drive shaft 40, but at a lesser rate, it is necessary that the wheel 160 and the flange 148 be in their neutral positions. Then when the drive belt 142 is tensioned, the pulleys 140 and 88 are connected. This is accomplished by moving the pin 198 counter-clockwise from its high speed forward position around to a position 180° from that illustrated in Figure 4. This results in the engagement of the pin 198 with the cam 220 and the pivoting of the roller 210 into engagement with the drive belt 142. The engagement of the roller 210 into engagement with the drive belt 142. The engagement of the roller 210 of the drive belt 142 results in the tensioning of the drive belt 142 and the interconnecting of the pulleys 140 and 88.

It will be understood that the various ratios of drive of the driven shaft 54 relative to the drive shaft 40 may be varied through the interchanging of the pulleys and drive wheels.

Although the invention has been illustrated and described as utilizing V-belts, it will be understood that other flexible drive devices may be utilized also, it will be understood that, if so desired, the friction wheels could be flat.

Further, splines, keys or other similar securing means may be utilized to drivingly and slidingly mount the pulleys on the shafts.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A transmission comprising a housing, a rotatable drive shaft fixedly carried by said housing, a rotatable driven shaft fixedly carried by said housing, a rotatable idler shaft fixedly carried by said housing, means drivingly connecting said drive shaft to said idler shaft, flexible drive means selectably connecting said idler shaft to said driven shaft, direct friction drive means selectively connecting said idler shaft to said driven shaft.

2. A transmission comprising a housing, a rotatable drive shaft fixedly carried by said housing, a rotatable driven shaft fixedly carried by said housing, a rotatable idler shaft fixedly carried by said housing, means drivingly connecting said drive shaft to said idler shaft, flexible drive means selectably connecting said idler shaft to said driven shaft, direct friction drive means selectively connecting said idler shaft to said driven shaft, said flexible drive means driving said driven shaft in an opposite direction from said direct friction drive means.

3. A transmission comprising a housing, a rotatable drive shaft carried by said housing, a rotatable driven shaft carried by said housing, a rotatable idler shaft carried by said housing, means drivingly connecting said drive shaft to said idler shaft, flexible drive means selectably connecting said idler shaft to said driven shaft, direct friction drive means selectively connecting said idler shaft to said driven shaft, said flexible drive means including pulleys and a drive belt, said direct friction drive means including a pair of friction wheels, the pulley on said idler shaft including split halves, one of said halves being connected to the friction wheel on said idler shaft for sliding movement therewith relative to the other of said halves and said idler shaft.

4. A transmission comprising a housing, a rotatable drive shaft carried by said housing, a rotatable driven shaft carried by said housing, a rotatable idler shaft carried by said housing, means drivingly connecting said drive shaft to said idler shaft, flexible drive means selectably connecting said idler shaft to said driven shaft, direct friction drive means selectively connecting said idler shaft to said driven shaft, said flexible drive means including a first pair of pulleys connected to said driven shaft, a second pair of pulleys connected to said idler shaft, drive belts connecting associated pulleys of each pair, means for selectively individually tensioning said drive belts, individual pulleys of said second pair being of different diameter, individual pulleys of said first pair being of equal diameters to permit a selection of speed ratios.

5. A transmission comprising a housing, a rotatable drive shaft carried by said housing, a rotatable driven shaft carried by said housing, a rotatable idler shaft carried by said housing, means drivingly connecting said drive shaft to said idler shaft, flexible drive means selectably connecting said idler shaft to said driven shaft, direct friction drive means selectively connecting said idler shaft to said driven shaft, said flexible drive means including a first pair of pulleys connected to said driven shaft, a second pair of pulleys connected to said idler shaft, drive belts connecting associated pulleys of each pair, means for selectively individually tensioning said drive belts, individual pulleys of said second pair being of different diameter, individual pulleys of said first pair being of equal diameters to permit a selection of speed ratios, one pulley of said second pair of pulleys being of the split halves types, the drive belt of the other pulley of said second pair having associated therewith a tensioning roller.

6. A transmission comprising a housing, a rotatable drive shaft carried by said housing, a rotatable driven shaft carried by said housing, a rotatable idler shaft carried by said housing, means drivingly connecting said drive shaft to said idler shaft, flexible drive means selectably connecting said idler shaft to said driven shaft, direct friction drive means selectively connecting said idler shaft to said driven shaft, said flexible drive means including pulleys and a drive belt, said direct friction drive means including a pair of friction wheels, the pulley on said idler shaft including split halves, one of said halves being connected to the friction wheel on said idler shaft for sliding movement therewith relative to the other of said halves, shifting means carried by said housing for selectively positioning the friction wheel of the idler shaft thereon.

7. A transmission comprising a housing, a rotatable drive shaft fixedly carried by said housing, a rotatable driven shaft fixedly carried by said housing, a rotatable idler shaft fixedly carried by said housing, means drivingly connecting said drive shaft to said idler shaft, flexible drive means selectably connecting said idler shaft to said driven shaft, direct friction drive means selectively connecting said idler shaft to said driven shaft, single control means for selectively engaging said drive means for rotating said driven shaft in opposite directions at different speed.

8. A transmission comprising a housing, a rotatable drive shaft carried by said housing, a rotatable driven shaft carried by said housing, a rotatable idler shaft carried by said housing, means drivingly connecting said drive shaft to said idler shaft, flexible drive means selectably connecting said idler shaft to said driven shaft, direct friction drive means selectively connecting said idler shaft to said driven shaft, said flexible drive means including pulleys and a drive belt, said direct friction drive means including a pair of friction wheels, the pulley on said idler shaft including split halves, one of said halves being connected to the friction wheel on said idler shaft for sliding movement therewith relative to the other of said halves, said flexible drive means also including a second pulley on said idler shaft, a second pulley on said driven shaft and a drive belt selectively connecting said second pulleys.

9. A transmission comprising a housing, a rotatable drive shaft carried by said housing, a rotatable driven shaft carried by said housing, a rotatable idler shaft carried by said housing, means drivingly connecting said drive shaft to said idler shaft, flexible drive means selectably connecting said idler shaft to said driven shaft, direct friction drive means selectively connecting said idler shaft to said driven shaft, said flexible drive means including pulleys and a drive belt, said direct friction drive means including a pair of friction wheels, the pulley on said idler shaft including split halves, one of said halves being connected to the friction wheel on said idler shaft for sliding movement therewith relative to the other of said halves, said flexible drive means also including a second pulley on said idler shaft, a second pulley on said driven shaft and a drive belt selectively connecting said second pulleys, single control means for selectively engaging said drive means for rotating said driven shaft in opposite directions at different speed.

10. A transmission comprising a housing, a rotatable drive shaft carried by said housing, a rotatable driven shaft carried by said housing, a rotatable idler shaft carried by said housing, means drivingly connecting said drive shaft to said idler shaft, flexible drive means selectably connecting said idler shaft to said driven shaft, direct friction drive means selectively connecting said idler shaft to said driven shaft, said flexible drive means including pulleys and a drive belt, said direct friction drive means including a pair of friction wheels, the pulley on said idler shaft including split halves, one of said halves being connected to the friction wheel on said idler shaft for sliding movement therewith relative to the other of said halves and said idler shaft, single control means for selectively engaging said drive means for rotating said driven shaft in opposite directions at different speed.

11. A transmission comprising a housing, a rotatable drive shaft carried by said housing, a rotatable driven shaft carried by said housing, a rotatable idler shaft carried by said housing and means drivingly connecting said drive shaft to said idler shaft, flexible drive means selectively connecting said idler shaft to said driven shaft, direct friction drive means selectively connecting said idler shaft to said driven shaft, means for selectively engaging said drive means for rotating said driven shaft in opposite directions at different speeds, said control means including a slide member connected to said friction drive means and a tension roller assembly for said flexible drive means, a cam member engaged with said slide member and said tension roller assembly, and means for selectively positioning said cam member.

References Cited in the file of this patent

UNITED STATES PATENTS

| 1,236,749 | Osser | Aug. 14, 1917 |
| 1,601,530 | Ireland et al. | Sept. 28, 1926 |
| 2,654,260 | Lewis | Oct. 6, 1953 |

FOREIGN PATENTS

| 597,513 | France | Aug. 31, 1925 |